United States Patent [19]

Davis et al.

[11] Patent Number: 5,516,829

[45] Date of Patent: * May 14, 1996

[54] HEAT SEAMABLE FLAME RETARDANT ROOF SHEETING WITH HIGHLY CRYSTALLINE THERMOPLASTICITY PROMOTERS AND METHOD FOR COVERING ROOFS

[76] Inventors: James A. Davis, 13071 Williamsburg Ave., Uniontown, Ohio 44685; Joseph K. Valaitis, 9193 Windswept Dr., Brecksville, Ohio 44141

[*] Notice: The portion of the term of this patent subsequent to Feb. 14, 2012, has been disclaimed.

[21] Appl. No.: 926,737

[22] Filed: Aug. 10, 1992

[51] Int. Cl.⁶ .................................................. C08K 3/10
[52] U.S. Cl. ........................ 524/411; 524/495; 524/505; 524/515; 524/519; 525/209; 525/213; 525/214; 525/239; 525/88; 525/95; 525/240
[58] Field of Search .................................. 524/411, 495, 524/505, 515, 519; 525/209, 213, 214, 239, 240, 95, 88

[56] References Cited

U.S. PATENT DOCUMENTS

| | | | |
|---|---|---|---|
| 3,280,082 | 10/1966 | Natta et al. | 260/80.7 |
| 3,650,874 | 3/1972 | Job et al. | 161/217 |
| 3,660,530 | 5/1972 | Hoblit et al. . | |
| 3,801,531 | 4/1974 | Berejka et al. | 260/33.4 |
| 3,867,247 | 2/1975 | O'Farrell et al. | 161/88 |
| 3,887,530 | 6/1975 | O'Farrell et al. | 260/79.3 |
| 3,919,358 | 11/1975 | Batiuk et al. | 260/897 |
| 3,941,859 | 3/1976 | Batiuk et al. | 260/897 |
| 4,036,912 | 7/1977 | Stricharczuk | 260/897 |
| 4,130,535 | 12/1978 | Coran et al. | 260/33.6 |
| 4,210,579 | 7/1980 | Grigo et al. | 525/88 |
| 4,212,787 | 7/1980 | Matsuda et al. | 260/33.6 |
| 4,229,504 | 10/1980 | Barchman | 428/461 |
| 4,247,661 | 1/1981 | Herman et al. | 525/88 |
| 4,263,186 | 4/1981 | Bluemel . | |
| 4,355,139 | 10/1982 | Coran et al. | 525/133 |
| 4,435,466 | 3/1984 | Kuhnel et al. | 428/215 |
| 4,438,228 | 3/1984 | Schenck | 524/109 |
| 4,480,012 | 10/1984 | Fieldhouse | 428/506 |
| 4,480,065 | 10/1984 | Kawai et al. | 524/418 |
| 4,537,825 | 8/1985 | Yardley | 428/327 |
| 4,601,935 | 7/1986 | Metcalf et al. | 428/57 |
| 4,687,810 | 8/1987 | Coran | 525/74 |
| 4,732,925 | 3/1988 | Davis | 524/426 |
| 4,742,119 | 5/1988 | Close | 525/211 |
| 4,767,658 | 8/1988 | Lorenz | 428/192 |
| 4,778,852 | 10/1988 | Futamura | 525/97 |
| 4,801,639 | 1/1989 | Hoshi et al. | 524/112 |
| 4,803,020 | 2/1989 | Valaitis et al. | 264/22 |
| 4,833,194 | 5/1989 | Kuan et al. | 524/525 |
| 4,839,412 | 6/1989 | Harrell et al. | 524/436 |
| 4,845,145 | 7/1989 | Hazelton et al. | 524/426 |
| 4,851,463 | 7/1989 | Opsahl et al. | 524/109 |
| 4,855,362 | 8/1989 | Muse, Jr. et al. | 525/194 |
| 4,894,408 | 1/1990 | Hazelton et al. | 524/425 |
| 4,912,148 | 3/1990 | Kim et al. | 524/487 |
| 4,918,127 | 4/1990 | Adur et al. | 524/415 |
| 4,985,502 | 1/1991 | Izumi et al. | 525/194 |
| 5,051,477 | 9/1991 | Yu et al. | 524/528 |
| 5,070,111 | 12/1991 | Dumbauld | 521/82 |
| 5,086,121 | 2/1992 | Hazelton et al. | 525/197 |
| 5,206,305 | 4/1993 | Tojo et al. | 525/331.7 |

*Primary Examiner*—Paul R. Michl
*Assistant Examiner*—Edward Cain

[57] ABSTRACT

A heat seamable flame retardant sheet material for roofing prepared from an uncured polymeric composition of matter which comprises 100 parts by weight of a polymer blend comprising from about 50 to 90 parts by weight of halogenated polyolefins having up to about 2 percent by weight crystallinity, which polyolefins are prepared from monomers having at least 2 carbon atoms, and mixtures thereof and from about 10 to 50 parts by weight of a highly crystalline thermoplasticity promoter selected from the group consisting of polymeric olefins prepared from monomers consisting of at least two carbon atoms; from about 50 to 250 parts by weight of a filler selected from the group consisting of reinforcing and non-reinforcing materials and mixtures thereof per 100 parts of the polymer blend; from about 20 to 105 parts by weight of a processing material and mixtures thereof, per 100 parts of the polymer blend; and from about 15 to 90 parts by weight of an additive selected from the group consisting of flame retardant materials and mixtures thereof, per 100 parts of the polymer blend. A method for covering a roof comprises the steps of applying layers of sheet material as described above to the roof being covered; overlapping adjacent edges of the layers; heating the overlapped areas to slightly above the softening point of the sheet material and seaming the overlapped areas using heat and sufficient pressure to provide an acceptable seam, the composition of matter having sufficient self-adhesion without the use of an adhesive.

7 Claims, No Drawings

HEAT SEAMABLE FLAME RETARDANT ROOF SHEETING WITH HIGHLY CRYSTALLINE THERMOPLASTICITY PROMOTERS AND METHOD FOR COVERING ROOFS

TECHNICAL FIELD

The present invention relates generally to sheeting material used for roofing. More particularly, the present invention relates to heat seamable sheeting material which exhibits excellent flame resistivity and weathering resistance. Specifically, the sheeting material is comprised of halogenated olefinic elastomers and highly crystalline thermoplasticity promoters such as high density polyethylene (HDPE), low density polyethylene (LDPE) and other similar olefin type polymers as well as copolymers of ethylene/butene and ethylene/octene and the like and mixtures thereof. A method is also provided for covering roofs which includes the step of employing the sheeting material of the present invention.

BACKGROUND OF THE INVENTION

Polymeric roof sheeting is used as single ply roofing membrane for covering industrial and commercial flat roofs. Such membranes are generally applied to the roof surface in vulcanized or cured state.

Because of outstanding weathering resistance and flexibility, cured elastomeric roof sheeting has been rapidly gaining acceptance. This material normally is prepared by vulcanizing the composition in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation. Vulcanization and curing can be done in the presence of other compounds as well. For example, ethylene-butene copolymers may be cured in the presence of triazine or organic peroxide.

Notwithstanding the usefulness of radiation curing, sulfur curing, and triazine curing, a disadvantage of utilizing these elastomers is the lack of adhesion of these elastomers, especially cured olefinic elastomers to themselves. This is a serious problem because in applying elastomeric sheets to a roof, it is usually necessary to splice the cured elastomeric sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions.

In view of the foregoing problem, it has been necessary to utilize an adhesive to bond the cured elastomeric sheets together. As will be evident from the above discussion, an adhesive for bonding cured elastomeric roofing sheets together must meet a number of requirements which are extremely difficult to satisfy. Thus, the adhesive must provide sufficient peel and adhesive strength to permit the splice formed by bonding the cured elastomeric roofing sheets together to resist both the short term and long term stresses such as those discussed hereinabove. Moreover, the adhesive must be resistant to oxidation, hydrolysis and chemical attack from portred water. Additionally, the adhesive must provide the important property often referred to in the adhesive art as "Quick Stick". The term "Quick Stick" means the characteristics of two sheets of material which have been coated with an adhesive composition to develop virtually immediate adhesive strength when placed in contact with each other.

Quick Stick is an extremely important property in an adhesive which is utilized to splice cured elastomeric roofing sheets together. Thus, adhesive compositions presently known generally require anywhere from about two (2) to about seven (7) days at room temperature (i.e. 22° C.) to attain maximum adhesive strength. At higher ambient temperature, this time period may be somewhat less but at minimum it will generally be at least 24 hours. The conventional procedure for splicing the elastomeric roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two (2) to seven (7) days.

Commercial contact adhesives which are conventionally employed for bonding cured elastomeric roofing sheets together generally consist of solutions of neoprene or neoprene-type or butyl or butyl-type polymers in aromatic or aromatic-aliphatic solvents containing 2-butanone often along with tackifying resins. However, such adhesives have not proven to be very satisfactory due to their lower than desirable peel adhesion strengths. Thus, the neoprene or butyl-type adhesives often provide peel adhesion values at 22° C. of only 1 to 2 pounds per linear inch.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. Nos. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured elastomeric roofing sheets together and that is their deficiency in Quick Stick properties.

One such adhesive system for olefinic elastomers that provides good Quick Stick is described in U.S. Pat. No. 4,480,012, owned by the Assignee of record herein. Such adhesives comprise a neutralized sulfonated EPDM elastomeric terpolymer; an organic hydrocarbon solvent; a para-alkylated phenol formaldehyde tackifying resin and an alkylphenol or ethoxylated alkylphenol.

Notwithstanding the problem of adhesion, the elastomeric roof sheeting materials also lack flame resistivity. In order to improve the flame resistivity of the product using the olefinic elastomers, fillers such as antimony trioxide, decabromo diphenyl oxide (DBDPO), dechlorane (chlorinated alicyclic hydrocarbon) alumina trihydrate, and chlorinated or brominated paraffins, are normally incorporated into the composition as shown in U.S. Pat. Nos. 4,839,412 and 4,851,463. However, the capacity of these membranes to accept these flame retardant fillers is somewhat limited, especially with membranes which exhibit thermoplastic characteristics.

Furthermore, U.S. Pat. No. 4,801,639 relates to flame retardant olefinic resin compositions which comprise a mixed resin of olefin and a silane-grafted polymer, a hydrated metal compound and a dicarboxylic acid or dicarboxylic acid anhydride derivative.

Therefore, while the use of adhesive compositions and flame retardant additives are effective means of joining and sealing the edges of elastomeric roofing material and increasing flame retardancy, respectively, if the use of adhesives could be eliminated and/or the amount of flame retardant additive reduced, the additional labor and material costs and related hardware necessary to apply the adhesive or incorporate the additive would effect a significant cost savings. Moreover, elimination of the need to cure the material prior to its application to a roof would also be advantageous. Also, a need for elastomeric roofing material with improved seam strength at elevated temperatures and improved flame retardancy continues to exist.

SUMMARY OF THE INVENTION

It is thus an object of the present invention to provide heat seamable flame retardant elastomeric roof sheeting materials that show high seam strength at elevated temperatures.

It is still another object of the present invention to provide a method for covering roofs which employs a heat seamable flame retardant olefin type elastomer as roof sheeting materials.

It is another object of the present invention to provide compositions which have sufficient crystallinity to show thermoplastic behavior during the formation of a seam using both heat and pressure, but which will continue to maintain its flame resistance.

It is yet another object of the present invention to provide compositions which have elastomeric characteristics at both ambient and elevated temperatures and will maintain improved flame resistance regardless of the surrounding temperature.

It is still a further object of the present invention to provide a composition with improved flame retardancy properties.

In general the present invention relates to a heat seamable flame retardant sheet material for roofing prepared from an uncured polymeric composition of matter comprising 100 parts by weight of a polymer blend comprising from about 50 to 90 parts by weight of a halogenated olefinic elastomer selected from the group consisting of halogenated polyolefins having up to about 2 percent by weight crystallinity, which polyolefins are prepared from monomers having at least 2 carbon atoms, and mixtures thereof and from about 10 to 50 parts by weight of a highly crystalline thermoplasticity promoter selected from the group consisting of polyolefin polymers prepared from monomers containing at least two carbon atoms; from about 50 to 250 parts by weight of a filler selected from the group consisting of reinforcing and non-reinforcing materials and mixtures thereof per 100 parts of the polymer blend; from about 20 to 105 parts by weight of a processing material and mixtures thereof per 100 parts of the polymer blend; from about 15 to about 90 parts by weight of an additive selected from the group consisting of flame retardant materials and mixtures thereof per 100 parts of the polymer blend.

A method for covering a roof is also provided and comprises the steps of applying layers of self-adhering sheet material prepared from an uncured polymeric composition of matter comprising blends of a halogenated olefinic elastomer and a highly crystalline thermoplasticity promoter, fillers, processing materials and additives selected from the group consisting of flame retardant materials and mixtures thereof, to the roof being covered; overlapping adjacent edges of the layers; heating the overlapped areas to slightly above the softening point of the sheet material; and seaming the overlapping areas using heat and under sufficient pressure to form an acceptable seam.

At least one or more of the foregoing objects which shall become apparent to those skilled in the art are described in greater detail with reference to the specification which follows.

PREFERRED EMBODIMENT OF THE INVENTION

As noted hereinabove, the roof sheeting materials of the present invention comprise olefinic elastomers. Importantly, these elastomers have been halogenated which has been shown to improve the flame resistivity of the composition. Thus, while it is known that additives may be added to compositions which include these olefinic elastomers to improve flame resistivity, the present invention improves the flame resistivity of the composition by halogenating the elastomer. Notwithstanding the flame retardancy of the halogenated elastomer, a flame retardant additive may also be added to still further improve the flame resistivity of the roof sheeting materials.

Halogenated olefinic elastomers include a wide range of olefin type polymers, the polymers being prepared from monomers having at least two (2) carbon atoms. Notably, these elastomers include ethylene-propylene terpolymer (EPDM), ethylene-propylene copolymer (EPR), ethylene-butene copolymer, or other similar olefin type polymers which may be halogenated.

Preferably, these elastomers are either chlorinated or brominated. The preferred halogenated elastomers have from about 10 to about 30 parts by weight of a halogen per 100 parts of the copolymer, preferably chlorine or bromine, and from about 50 to about 78 parts by weight ethylene with the balance of the copolymer being propylene, butene, or some other similar olefin type polymer.

A particularly useful and preferred halogenated olefinic elastomeric material is C-ELASTOMER (Mitsui Petrochemical. Industries, Ltd.). C-ELASTOMER is new ethylene-based rubber to which oil-resistant, adhesive, and flame resistant properties are added by chlorination. Based on NMR data, C-ELASTOMER is a chlorinated ethylene-butene copolymer which, like other ethylene-based rubbers, has excellent weathering resistance as well as resistance to ozone and heat. The physical properties of C-ELASTOMER compare favorably with those of thermoplastic materials such as chloroprene and chlorosulfonated polyethylene.

C-ELASTOMER has a Mooney Viscosity (ML/4 at 135° C.) of about 29.5; a C-Cl/CH$_3$ ratio of about 22 to 4 and a specific gravity at 23° C. of about 0.963. This particular chlorinated elastomer has a crystallinity, from the ethylene component, of 1.24 weight percent, as determined using differential scanning calorimeter (DSC) technique; an Mn as measured by GPC of at least about 64,775 and an Mw, as measured by GPC of at least about 115,800. To be useful as a roofing material in the present invention it is necessary that the elastomer have an Mn as measured by GPC of at least about 30,000 and an Mw, as measured by GPC of at least about 100,000. The chlorine content of C-ELASTOMER is about 30 weight percent.

In addition to the halogenated elastomers, the roof sheeting materials of the present invention include within the polymeric composition, a thermoplasticity promoter, such as high density polyethylene (HDPE), low density polyethylene (LDPE) or other polyolefins prepared from monomers containing at least two carbon atoms. Typical examples of commercially available thermoplasticity promoters that can be blended with the halogenated elastomer have been set forth in Table I along with melting temperatures and percent of crystallinity. The melt temperatures and amount of crystallinity were determined using differential scanning calorimeter (DSC) technique.

TABLE I

CRYSTALLINITY ENHANCING POLYMERS

| | Tm, °C. | % crystallinity |
|---|---|---|
| ETHYLENE HOMOPOLYMERS | | |
| POLYWAX 2000[a] | 128 | 89.9 |
| POLYWAX 3000[b] | 121 | 93.2 |
| LDPE 722[c] | 112 | 39.1 |
| LDPE 132[d] | 109 | 27.7 |
| LDPE 640[e] | 113 | 39.9 |
| LDPE 768[f] | 119 | 45.8 |
| LDPE CG-2523[g] | 111 | 53.6 |
| HDPE 12065[h] | 134 | 66.8 |
| HDPE 62013[i] | 131 | 61.2 |
| PETROLITE E-2020[j] | 116 | 85.9 |
| POLYPROPYLENE HOMOPOLYMERS | | |
| EASTOBOND D-7682-109S[k] | 153 | 4.7 |
| A-FAX 500[l] | 155 | 5.8 |
| ETHYLENE/PROPYLENE COPOLYMERS | | |
| RLX-020[m] | 152 | 35.8 |
| ETHYLENE/OCTENE COPOLYMERS | | |
| ATTANE 4003[n] | 123 | 36.9 |
| ATTANE 4001[o] | 124 | 35.0 |
| DOWLEX 2047A[p] | 124 | 39.8 |
| DOWLEX 2045[q] | 124 | 42.2 |
| DOWLEX 2038[r] | 127 | 53.6 |
| DOV4LEX 2027[s] | 113 | 41.5 |
| ETHYLENE/BUTENE COPOLYMER | | |
| GERS-1085[t] | 71 | 2.3 |

[a]High melting polyethylene having a molecular weight of about 2000 (Petrolite)
[b]High melting polyethylene having a molecular weight of about 3000 (Petrolite)
[c]Low density polyethylene resin, density 0.916 (Dow Chemical)
[d]Low density polyethylene resin, density 0.919 (Dow Chemical)
[e]Low density polyethylene resin, density 0.922 (Dow Chemical)
[f]Low density polyethylene resin, density 0.930 (Dow Chemical)
[g]Low density polyethylene resin, density 0.923 (Dow Chemical)
[h]High density polyethylene resin, density 0.94 (Dow Chemical)
[i]High density polyethylene resin, density 0.94 (Dow Chemical)
[j]Petroleum-derived oxidized hydrocarbon having an acid number of 22 (Petrolite)
[k]Amorphous polypropylene (Eastman Chemical)
[l]Amorphous polypropylene (Himont, USA, Inc.)
[m]Ethylene/propylene copolymer (2% Ethylene) molecular weight about 400,000 (Phillip's Petroleum)
[n]Ethylene-octane copolymer, density 0.905 (Dow Chemical)
[o]Ethylene-octane copolymer, density 0.912 (Dow Chemical)
[p]Ethylene-octene copolymer, density 0.917 (Dow Chemical)
[q]Ethylene-octene copolymer, density 0.920 (Dow Chemical)
[r]Ethylene-octene copolymer, density .0.935 (Dow Chemical)
[s]Ethylene-octane copolymer, density 0.941 (Dow Chemical)
[t]Ethylene-butene copolymer (about 82% ethylene), density 0.884 (Union Carbide Corporation)

The highly crystalline thermoplasticity promoters listed in Table I are necessary, when the polymer blend comprises increasing amounts of the halogenated olefin type elastomer having less than 2 weight percent crystallinity. However, even if the elastomer selected is exclusively one having crystallinity greater than 2 percent by weight, the presence of a crystalline thermoplasticity promoter of the present invention provides increased adhesion, especially seam shear strength.

Particularly useful and preferred thermoplasticity promoters include HDPE 12065, HDPE 62013, LDPE CG-2523 and LDPE 768, all commercially available from Dow Chemical. HDPE 12065 has a specific gravity of 0.94; a peak softening temperature of 134° C. and a crystallinity of 66.8 weight percent. HDPE 62013 has a specific gravity of 0.94; a peak softening temperature of 131° C. and a crystallinity of 61.2 weight percent; LDPE CG-2523 has a specific gravity of 0.923, a peak softening temperature of 111° C. and a crystallinity of 53.6 weight percent. LDPE 768 has a specific gravity of 0.93, a peak softening temperature of 119° C. and a crystallinity of 45.8 weight percent.

The composition or compound employed to form the roof sheeting material comprises about 50 to 90 parts by weight of the halogenated olefinic elastomer to which is added from about 10 to 50 parts by weight of a highly crystalline thermoplasticity promoter selected from the group consisting of polymeric olefins prepared from monomers containing at least two carbon atoms, fillers, additives, and processing materials as well as optionally other components including curatives, all of which are discussed hereinbelow.

With respect first to the filler, suitable fillers are selected from the group consisting of reinforcing and non-reinforcing materials, and mixtures thereof, as are customarily added to rubber. Examples include such materials as carbon black, ground coal, calcium carbonate, clay, silica, cryogenically ground rubber and the like. Generally, preferred fillers include carbon black, ground coal and cryogenically ground rubber.

Carbon black is used in an amount of about 20 parts to about 300 parts per 100 parts of polymer (phr), preferably in an amount of about 60 to about 150 phr. The preferred range of carbon black herein (60 to 150 phr) is about equal to the amount of carbon black normally used in preparing sulfur cured elastomeric roof sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of about 1.22±0.03, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 being preferred.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of about 1.129±0.015 and a particle size ranging from about 30 to about 300 microns with an average particle size ranging from about 50 to about 80 microns. Amounts range from about 5 to 40 phr with about 10 to 25 being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts thereof fall within the range of amounts normally employed in preparing sulfur cured conventional roof sheeting.

With respect to the processing oil, it is included to improve the processing behavior of the composition (i.e. reduce mixing time and increase calendaring rate). The processing oil is included in an amount ranging from about 20 parts to about 105 parts by weight of process oil per 100 parts halogenated elastomer ingredient, preferably in an amount ranging from about 45 parts to about 75 parts by weight. Preferred processing oils are a paraffinic oil, e.g. Sunpar 2280 which is available from the Sun Oil Company, and a chlofinated paraffin oil, e.g. Paroil 5761 which is available from Dover Chemical Company, or mixtures thereof. Other petroleum derived oils including naphthenic oils may be used.

With respect to the additives, suitable additives are selected from the group consisting of flame retardant materials, and mixtures thereof, commonly incorporated into the rubber. Examples of such flame retardant additives include antimony trioxide, decabromodiphenyl oxide (DBDPO), alumina trihydrate, chlorinated or brominated paraffins, and mixtures thereof. These additives are generally included in an amount ranging from about 15 parts to about 90 parts by weight of additive per 100 parts of the polymer blend (phr), preferably in an amount ranging from about 20 parts to about 50 parts by weight.

A preferred additive is a mixture of antimony trioxide and a liquid chlorinated paraffin, e.g. Chloroflo-42 available from Dover Chemical Company which has a chlorine content of 42 percent by weight. The relative amounts of these two additives as a mixture can vary, but the overall total amount of additive mixture should not exceed 30 parts by weight. The ratio of antimony trioxide to liquid chlorinated paraffin may range from a desired 1:1 ratio to perhaps a ratio of 5:1.

Optional ingredients include, for example, other elastomers (e.g., butyl elastomer, neutralized sulfonated EPDM, neutralized sulfonated butyl) in place of minor amounts of the halogenated elastomers, secondary inorganic fillers (e.g., talc, mica, clay, silicates, whiting) with total secondary filler content usually ranging from about 10 to about 130 phr, and conventional amounts of other conventional additives, such as zinc oxide, stearic acid, antioxidants, antiozonants, and the like.

The compounding ingredients can be admixed, utilizing an internal mixer (such as a Banbury mixer), an extruder, and/or a two-roll mill, or other mixers suitable for forming a viscous relatively uniform admixtures. When utilizing a type B Banbury internal mixer, in a preferred mode, the dry or powdery materials such as carbon black are added first followed by the liquid process oil and finally the polymer (this type of mixing can be referred to as an upside-down mixing technique).

The resulting admixture is sheeted to a thickness ranging from 5 to 200 mils, preferably from 35 to 60 mils, by conventional sheeting methods, for example, milling, calendaring or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40–45 gauge, since this is the thickness for a large percentage of "single-ply" roofing membranes used commercially. The sheeting can be cut to desired length and width dimensions at this time.

The method of the present invention is practiced by utilizing a halogenated elastomeric sheet material as described herein. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention.

Assuming an overlap of several inches, the next step is to apply heat and some pressure to the edge area to form the seam. Temperature is conveniently applied from about 80° to 550° C. Generally, the seam area, comprising overlapping edges of adjacent sheets, should be heated to slightly above the softening temperature of the sheet material. Numerous techniques which utilize heat and pressure can be used to produce an effective seam as are known to those skilled in the art. Pressure can vary widely from a minimum of about 3 psi up to about 60 psi, typically so long as it is adequate to provide an acceptable seam.

In order to demonstrate practice of the present invention, several halogenated elastomeric compounds according to the present invention were prepared and subjected to both peel and shear adhesion tests, as will now be set forth in detail. The halogenated elastomer selected was the chlorinated elastomer, C-ELASTOMER, characterization of which is presented in Table II hereinbelow.

TABLE II

| POLYMER CHARACTERIZATION STUDY | |
|---|---|
| | C-Elastomer |
| ML/4 at 135° C. | 29.5 |
| Chlorine Content, Weight % | 30.6 |
| Crystallinity, Weight % (by DSC) | 1.24 |
| Tg, °C. (by DSC) | -31.8 |
| Tm, °C. (by DSC) | 50.6 |
| C—Cl/CH$_3$ Ratio (by NMR) | 22/4 |
| Specific Gravity @ 23° C. | 0.963 |
| $\bar{M}n$ | 64,775 |
| $\bar{M}w$ | 115,800 |
| $\bar{M}n/\bar{M}w$ Ratio | 1.79 |

The following examples represent heat seamable flame retardant (FR) membrane compositions based upon C-ELASTOMER, a chlorinated ethylene-butene copolymer and commercially available from Mitsui Petrochemical Industries, Ltd., and are submitted for the purpose of further illustrating the nature of the present invention and are not to be considered as a limitation on the scope thereof.

TABLE III

HEAT SEAMABLE FR TYPE MEMBRANES; BLENDS OF C-ELASTOMER AND HDPE

| Example No. | 1 | 2 | 3 | 4 | 5 | 6 |
|---|---|---|---|---|---|---|
| C-Elastomer | 100 | 90 | 80 | 70 | 60 | 50 |
| HDPE-12065 | — | 10 | 20 | 30 | 40 | 50 |
| HiStr GPF Black | 110 | 110 | 110 | 110 | 110 | 110 |
| Paraffinic Process Oil | 55 | 55 | 55 | 55 | 55 | 55 |
| Antimony Trioxide | 5 | 5 | 5 | 5 | 5 | 5 |
| Liquid Chlorinated Paraffin | 5 | 5 | 5 | 5 | 5 | 5 |
| TOTAL | 275 | 275 | 275 | 275 | 275 | 275 |

In the examples illustrated in Table III, Example No. 1 provides a halogenated elastomeric membrane based on C-ELASTOMER (without HDPE) as the control. Example No. 1 features 100% C-ELASTOMER, a chlorinated (non-crystalline) ethylene-butene copolymer having a Mooney Viscosity (ML/$_4$ at 135° C.) of about 29.5; a chlorine content of about 30.6 weight percent; a C-Cl/CH$_3$ ratio of 22:4 as determined by Nuclear Magnetic Reasonance (NMR) and a specific gravity of 0.963. Examples No. 2–6 were based on blends of C-ELASTOMER and HDPE 12065, a highly crystalline homopolymer of polyethylene. Example No. 1 was prepared utilizing standard rubber mixing techniques and equipment by mixing together the following ingredients: 100 parts C-ELASTOMER a chlorinated ethylene-butene copolymer, 110 phr HiStr GPF black, 55 phr paraffinic process oil, 5 phr antimony trioxide, and 5 phr Chloroflo-42 liquid chlorinated paraffin. The remaining examples No. 2–6 comprised 50 to 90 parts of the C-ELASTOMER (chlorinated ethylene-butene copolymer) 10 to 50 phr HDPE 12065 and the same levels of carbon black, process oil, antimony trioxide and liquid chlorinated paraffin used in the preparation of Example No. 1. Formulations for each appear in Table III, hereinabove with all parts per hundred parts of rubber hydrocarbon (phr) by weight, unless otherwise specified.

Physical testing data such as stress-strain properties, die C tear resistance, hardness, and oxygen index data are provided in Table IV hereinbelow.

For testing purposes, dumbbell shaped specimens were cut from individual milled 45 mil flat sheets according to ASTM D-412 (Method A-dumbbell and straight specimen). Modulus, tensile strength and elongation at break measurements were obtained using a table model Instron® Tester, Model 1130, and the test results were calculated in accordance with ASTM D-412. All dumbbell specimens were allowed to set for about 24 hours, following which testing was carried out at 23° C. Shore "A" hardness testing was conducted at 23° C. in accordance with ASTM Method D-2240.

Tear properties of milled 45 mil flat rubber sheets cut with a die C (90° angle die) were determined in accordance with ASTM Method D-624. Die C tear specimens were not nicked prior to testing. Tear resistance, in lbs/inch, was obtained using a table model Instron® Tester, Model 1130 and the test results were calculated in accordance with ASTM Method D-624. Testing was again carried out at 23° C.

Oxygen index testing was conducted in accordance with ASTM Method D- 2863 using a Stanton-Redcroft FTA flammability unit. The Oxygen Index Test uses a vertical glass tube 60 cm high and 8.4 cm in diameter, in which a rod or strip is held vertically by a clamp at its bottom end. A controlled mixture of oxygen and nitrogen is metered into the bottom of the tube through a bed of glass beads at the bottom to provide uniform flow of the gases. The sample is ignited at its upper end and the sample burns as a candle from the top down. The atmosphere which allows continuous burning is determined as Oxygen Index (O.I.). The O.I. is the minimum fraction of oxygen in the oxygen-nitrogen mixture which will just sustain burning for two inches or three minutes, whichever occurs first.

The uncured black and oil filled roofing membrane formulations featuring HDPE 12065, a highly crystalline homopolymer of polyethylene, in Examples No. 2–6, were characterized, for the most part, as higher modulus compositions having unaged die C tear and hardness properties much higher than the 100% chlorinated ethylenebuterie copolymer control, Example No. 1. Increases in modulus, tensile strength, die C tear and hardness properties resulted at the higher HDPE 12065 loadings.

TABLE IV

HEAT SEAMABLE MEMBRANES: BLENDS OF CHLORINATED ETHYLENE/BUTENE COPOLYMER AND HDPE - UNAGED PHYSICAL PROPERTIES

| Example No. | 1* | 2 | 3 | 4 | 5 | 6 |
|---|---|---|---|---|---|---|
| Stress-Strain Properties @ 23° C. | | | | | | |
| 100% Modulus, psi | 165 | 380 | 640 | — | — | — |
| Tensile at break, psi | 255 | 435 | 675 | 745 | 785 | 835 |
| Elongation at break, percent | 170 | 135 | 115 | 95 | 75 | 60 |
| Die C Tear Properties | | | | | | |
| Lbs/inch at 23° C. | 58 | 178 | 189 | 203 | 216 | 221 |
| Shore "A" Hardness | | | | | | |
| Tested at 23° C. | 53 | 59 | 67 | 73 | 79 | 86 |
| Limiting Oxygen Index (L.O.I.) - Stanton-Redcroft FTA Flammability Test Unit | | | | | | |
| Oxygen Index, % O$_2$ (with Sb$_2$O$_3$ and Chloroflo-42) | 26.2 | 25.8 | 25.5 | 24.9 | 24.4 | 23.6 |
| Oxygen Index, % O$_2$ (without Sb$_2$O$_3$ and Chloroflo-42) | 23.3 | — | — | — | — | — |

*100% Chlorinated Ethylene/Butene Copolymer

In contrast, better Limiting Oxygen Index (L.O.I.) performance was exhibited by increasing the amount of C-ELASTOMER, rather than by increasing HDPE 12065. L.O.I. performance for 100% C-ELASTOMER with 110 phr HiStr GPF black and 55 phr paraffinic process oil was 23.3 percent oxygen. However, addition of 5 phr antimony trioxide and 5 phr Chloroflo-42 (liquid chlorinated paraffin) to the composition increased L.O.I. performance from about 23.3 percent oxygen to about 26.2 percent oxygen, with Examples 2–6 exhibiting a directional decrease, but not less than about 23.6 percent oxygen.

The composition of the present invention also exhibited an acceptance of high filler and process oil loadings.

Seam peel and shear adhesion tests were also conducted, utilizing the adhesion test pads discussed hereinbelow, and are reported in Tables V and VI, respectively.

Detailed Peel and Shear Adhesion Test Procedure

Each of the above rubber compounds was subjected to adhesion testing which necessitated the building of test pads comprising 6×6 inch sheets reinforced by a fiber reinforcement scrim, according to the following procedure:

1. A 10×20-inch two roll mill was utilized to prepare a number of 6×6-inch sheets of rubber approximately 40 mils in thickness for building adhesion test pads.
2. In order to reinforce the uncured sheets of rubber, a 6×6-inch sheet of PVC treated polyester scrim (10×10 epi cord construction) was inserted between two 6×6-inch sheets of rubber.
3. The rubber-scrim assembly was covered with a layer of a Mylar film and placed in the cavity of a metal curing mold (6×6×0.075-inch).
4. The rubber-scrim assembly was then pressed in a Mylar film for about five minutes at about 149° C.
5. Two of the 6×6-inch scrim reinforced rubber pads were seamed together using a hand-held heating gun (Leister). Approximately 15 to 18 pounds force was supplied by means of a roller such as a standard two-inch wide metal roller. Satisfactory seams (either peel or shear) could be formed using only 3 to 4 pounds force and the standard two-inch wide rubber roller. The seams were allowed to equilibrate for 24 hours before testing.
6. A clicker machine with a one-inch wide die was utilized to prepare a number of test specimens for seam peel (Type B, 90° peel) and shear (Type A, 180° peel) adhesion testing.
7. Testing machine: Model 1130 Instron Universal Tester—a testing machine of the constant rate-of-jaw separation type. The machine was equipped With suitable grips capable of clamping the specimens firmly and without slippage throughout the tests.
8. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 93° C. Specimens were allowed 15 minutes to preheat prior to testing at elevated temperatures.
9. Adhesion strength is defined as:

peel adhesion strength (lbs./inch)= pounds force×sample width;

shear adhesion strength (lbs./square inch)= pounds force× sample width. Seam peel adhesion and seam shear strength for Examples 1–6 were conducted according to the test procedure outlined hereinabove with actual measured values being reported in Tables V and VI, respectively.

TABLE V

HEAT SEAMABLE FR TYPE ROOF MEMBRANES - SEAM PEEL ADHESION STUDY

| Example No. | 1* | 2 | 3 | 4 | 5 | 6 |
| --- | --- | --- | --- | --- | --- | --- |
| Peel Adhesion @ 23° C. - Heat Setting #9 (442° C.) | | | | | | |
| lbs/inch | 6 | 7 | 9.5 | 14 | 19 | 21 |
| Type of failure | (A) | (A) | (A) | (A), (B) | (B) | (B) |
| Peel Adhesion @ 70° C. - 15 Minute Preheat at 70° C. | | | | | | |
| lbs/inch | 0.4 | 0.4 | 0.4 | 0.6 | 1.3 | 1.8 |
| Type of failure | (A) | (A) | (A) | (A) | (B) | (B) |

*100% Chlorinated Ethylene/Butene Copolymer
(A) = Weld failure - failure at or near the rubber-to-rubber ply interface
(B) = Initial tearing at ply-to-ply interface, followed by rubber tearing to the fabric reinforcement (rubber-to-fabric failure)

TABLE VI

HEAT SEAMABLE FR TYPE ROOF MEMBRANES - SEAM SHEAR STRENGTH STUDY

| Example No. | 1* | 2 | 3 | 4 | 5 | 6 |
| --- | --- | --- | --- | --- | --- | --- |
| Shear Strength @ 23° C. - Heat Setting #9 (442° C.) | | | | | | |
| lbs/square inch | 62 | 79 | >73 | >78 | >84 | >108 |
| Type of failure | (A), (C) | (A), (C) | (c) | (C) | (C) | (C) |

TABLE VI-continued

HEAT SEAMABLE FR TYPE ROOF MEMBRANES - SEAM SHEAR STRENGTH STUDY

| Example No. | 1* | 2 | 3 | 4 | 5 | 6 |
|---|---|---|---|---|---|---|
| Shear Strength @ 70° C. - 15 Minute Preheat at 70° C. | | | | | | |
| lbs/square inch | 18 | 26 | >29 | >42 | >46 | >57 |
| Type of failure | (A), (C) | (A), (C) | (C) | (C) | (C) | (C) |
| Shear Strength @ 95° C. - 15 Minute Preheat at 95° C. | | | | | | |
| lbs/square inch | 8 | 15 | >19 | >30 | >36 | >39 |
| Type of failure | (A), (C) | (A), (C) | (C) | (C) | (C) | (C) |

*100% Chlorinated Ethylene/Butene Copolymer
(A) = Weld failure - failure at or near the rubber-to-rubber ply interface
(C) = Necking/breaking - scrim reinforced rubber test strip elongated and broke adjacent to the weld seam As can be determined from the adhesion data presented in Tables V and VI, seam peel adhesion and seam shear adhesion values were generally better for the heat seamable membranes (Examples No. 2–6) which featured blends of C-ELASTOMER/HDPE 12065 as compared to the 100% C-ELASTOMER control (Example No. 1). Seam peel adhesion for Example No. 1 (control) as shown in Table V was 6 lbs/inch at 23° C., while seam shear strength at 23° C. in Table VI was >62 lbs/square inch. Examples No. 2–6 were based on blends of C-ELASTOMER, a chlorinated ethylene-butene copolymer and HDPE 12065, a highly crystalline homopolymer of polyethylene. Both room temperature and high temperature seam peel and shear adhesion results were improved by replacing from 10 to 50 parts by weight of a chlorinated ethylene-butene copolymer, C-ELASTOMER, with an equal amount of HDPE 12065.

The membrane of the present invention (Examples Nos. 2–6) exhibited rubber tearing to the fabric reinforcement and rubber-to-fabric failure during the seam peel strength test. In the seam shear strength test, the fabric reinforced membranes failed by stretching or necking and eventually break or tear adjacent to the weld seam.

The test samples listed in Tables V and VI were tested at a crosshead and chart speed of two inches per minute using a Model 1130 Instron® Universal Tester in accordance with the adhesion test set forth in ASTM D-413. Seam peel and shear strengths were measured at room temperature (23° C.) as well as 70° C., with shear strength being further measured at 95 ° C.

In conclusion, it should be clear from the foregoing examples and specification disclosure that the use of highly crystalline thermoplasticity promoters together with halogenated elastomers to prepare sheet material for roofing allows such sheet material to be seamed along the edge areas, using sufficient pressure and heat, so as to improve high temperature properties such as die C tear resistance, flame resistance, peel and seam shear strength. It is to be understood that the invention is not limited to the specific types of halogenated olefinic elastomers or thermoplasticity promoters exemplified herein or by the disclosure of other typical halogenated olefinic elastomers provided herein, the examples having been provided merely to demonstrate the practice of the subject invention. Those skilled in the art may readily select other halogenated olefinic elastomers, or other similar thermoplasticity promoters according to the disclosure made hereinabove. Similarly, the invention is not necessarily limited to the particular fillers, processing material, and additives exemplified or the amounts thereof.

In view of the properties described above, the compositions of the present invention are valuable in the production of roofing membranes. Roofing membranes formed from the compositions of the present invention may be produced by any method conventionally used for producing roofing membranes from filled polymer compositions. For example, the membranes may be formed by a conventional calendering technique. Other methods, including spray coating and roller die forming may also be used. Roofing membranes formed from the compositions of the present invention may optionally be scrim reinforced.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A heat seamable flame retardant sheet for roofing prepared from an uncured polymeric composition of matter consisting essentially of:

100 parts by weight of a polymer blend consisting essentially of from about 50 to 90 parts by weight of a halogenated olefinic elastomer selected from the group consisting of halogenated polyolefins having up to about 2 percent by weight crystallinity, said polyolefins being prepared from monomers having at least 2 carbon atoms and mixtures thereof; and from about 10 to 50 parts by weight of a highly crystalline thermoplasticity promoter selected from the group consisting of polyolefin polymers prepared from monomers containing at least two carbon atoms;

from about 50 to 250 parts by weight of a filler selected from the group consisting of reinforcing and non-reinforcing materials and mixtures thereof, per 100 parts of said polymer blend;

from about 20 to 105 parts by weight of a processing material and mixtures thereof, per 100 parts of said polymer blend; and from about 15 to 90 parts by weight of an additive selected from the group consisting of flame retardant materials and mixtures thereof, per 100 parts of said polymer blend.

2. A heat seamable flame retardant sheet material, as set forth in claim 1, wherein said halogenated olefinic elastomer is selected from the group consisting of chlorinated and brominated ethylene-propylene and ethylene-butene copolymers.

3. A heat seamable flame retardant sheet material, as set forth in claim 2, wherein said filler comprises about 110 parts by weight of carbon black; said composition of matter includes about 55 parts by weight of processing oil; and said additive includes a mixture of about 5 parts by weight of antimony trioxide and about 5 parts by weight of liquid chlorinated paraffin.

4. A heat seamable flame retardant sheet material, as set forth in claim 1, wherein said thermoplasticity promoter comprises 50 parts by weight of high density polyethylene and exhibits a limited oxygen index performance of about 23.6 percent oxygen.

5. A method for covering a roof with a heat seamable flame retardant sheet material for roofing prepared from an uncured polymeric composition of matter comprising the steps of:

applying layers of self-adhering sheet material prepared from an uncured heat seamable flame retardant polymeric composition of matter consisting essentially of 100 parts by weight of a polymer blend consisting essentially of from about 50 to 90 parts by weight of a halogenated olefinic elastomer selected from the group consisting of halogenated polyolefins having up to about 2 percent by weight crystallinity, said polyolefins being prepared from monomers having at least 2 carbon atoms and mixtures thereof; and from about 10 to 50 parts by weight of a highly crystalline thermoplasticity promoter selected from the group consisting of polyolefin polymers prepared from monomers containing at least two carbon atoms;

from about 50 to 250 parts by weight of a filler selected from the group consisting of reinforcing and non-reinforcing materials and mixtures thereof, per 100 parts of said polymer blend;

from about 20 to 105 parts by weight of a processing material and mixtures thereof, per 100 parts by weight of said polymer blend; and from about 15 to 90 parts by weight of an additive selected from the group consisting of flame retardant materials and mixtures thereof, per 100 parts of said polymer blend, to the roof being covered; overlapping adjacent edges of said layers;

heating the overlapped areas to slightly above the softening point of the sheet material and seaming the overlapped areas using heat and under sufficient pressure to provide an acceptable seam strength, said composition of matter having sufficient self-adhesion without the use of an adhesive.

6. A method, as set forth in claim 5, wherein the step of heating is conducted under a temperature of at least about 82° C.

7. A method, as set forth in claim 5, wherein said filler comprises about 110 parts by weight of carbon black, said composition of matter includes about 55 parts by weight of processing oil, and said additive includes a mixture of about 5 parts by weight of antimony trioxide and about 5 parts by weight liquid chlorinated paraffin.

* * * * *